Aug. 6, 1968 S. R. KLINGER 3,395,870

AUTOMATIC TAPE WIND UP MEANS

Filed June 16, 1966 4 Sheets-Sheet 1

INVENTOR
STEPHEN R. KLINGER

BY Louis A Kline
John J. Matlago
Robert L Harrington
HIS ATTORNEYS

Aug. 6, 1968 S. R. KLINGER 3,395,870

AUTOMATIC TAPE WIND UP MEANS

Filed June 16, 1966 4 Sheets-Sheet 2

INVENTOR
STEPHEN R. KLINGER

BY Louis A. Kline
John J. Matlago
Robert L. Harrington
HIS ATTORNEYS

AUTOMATIC TAPE WIND UP MEANS

Filed June 16, 1966 4 Sheets-Sheet 3

INVENTOR
STEPHEN R. KLINGER

BY Louis A. Kline
John J. Matlago
Robert L. Harrington
HIS ATTORNEYS

Aug. 6, 1968 S. R. KLINGER 3,395,870

AUTOMATIC TAPE WIND UP MEANS

Filed June 16, 1966 4 Sheets-Sheet 4

INVENTOR
STEPHEN R. KLINGER

BY Louis A. Kline
John J. Matlago
Robert L. Harrington
HIS ATTORNEYS

United States Patent Office 3,395,870

Patented Aug. 6, 1968

3,395,870
AUTOMATIC TAPE WIND UP MEANS

Stephen R. Klinger, Los Angeles, Calif., assignor to The National Cash Register Company, Dayton, Ohio, a corporation of Maryland Filed June 16, 1966, Ser. No. 558,068
10 Claims. (Cl. 242—55.11)

ABSTRACT OF THE DISCLOSURE

An apparatus for automatically starting the winding of a tape onto a rotating take-up spool. Guide members guide the tape toward and against the friction gripping surface of the hub of the spool. Pressure is applied to the guide members which extend at least partially around the hub to induce a friction gripping of the hub to the tape whereby the tape is wound around the spool. The pressure is automatically released from the guide members responsive to the increased thickness of several windings around the hub.

This invention relates to take-up means for winding tape and the like into roll form, and more particularly to take-up means for automatically starting the winding of a tape such as paper tape onto a take-up spool.

Tape such as paper tape and the like is commonly used in modern day business machines as a medium for the recording of information representing business entries, as for example, in the printing out of rows of characters corresponding to data set up on the keyboard of a cash register. The tape being very long is generally maintained in roll form and may contain literally thousands of such recorded entries. In accordance with present business practices, it is highly desirable to have the printed information represented by the various entries transferred into electronic computers for high speed data processing. Whereas at one time transfer of the printed information on the tape into the computer was performed manually in a tedious and time consuming manner, with the substantial advance in present day technology, the task has been reduced by means of automatic optical character reading equipment to one of rapid simplicity. Such an advanced system for reading cash register tapes and the like is disclosed in U.S. Patent No. 3,217,294.

The equipment for automatically performing the reading operation is expensive and it is therefore important that the "idle" time of the equipment be kept to a minimum. Thus, any manual operation required for setting up the machines to enable the automatic reading of the paper tapes should be fast and simple. Unskilled labor can then, in a routine manner, quickly set the equipment into motion with a minimum of possible errors of the type which could cause false starts and other time consuming delays. Typically, the manual operation of setting up optical character reading equipment, such as might be employed in the system disclosed in the above mentioned U.S. Patent No. 3,217,294, involves positioning a roll of paper tape in a feed-out station and pulling the leading end of the tape past the reading station and placing it in contact with a drive mechanism. The machine is then started and the leading edge of the tape is drawn through the machine by the drive mechanism. A guide means directs the end of the tape from the drive mechanism to a take-up spool or reel where the edge is automatically engaged by the spool and wound thereon.

Automatically starting the winding of the tape onto the spool is deemed important for the above mentioned purposes of minimizing error and reducing the equipment's idle time. However, although seemingly a simple operation, satisfactorily accomplishing the automatic wind up of a paper tape requires fairly complex mechanism. For example, a common take-up device used in the industry produces a vacuum pressure within the take-up spool which is vented through the hub of the spool. As the leading edge of the tape is directed toward the spool, it is drawn by the vacuum tightly against the hub of the spool and held there while the spool rotates.

The vacuum pressure, if maintained sufficiently high, accomplishes the desired automatic wind up of the tape. However, the vacuum pumps and peripheral equipment for producing the vacuum pressures and high volume air flow necessary for such take-up mechanism is expensive. Furthermore, such machinery is very noisy and irritating to the operator and other workers within the area. For these and other reasons, there has heretofore existed a need for a relatively inexpensive, vacuumless automatic windup machinism which can reliably produce automatic start and wind-up for a paper tape. It is believed that the present invention satisfies this need.

In general, the preferred embodiment of this invention comprises a plurality of guide members which are positioned in a folded manner around the hub of a take-up spool. The tape is guided from the drive mechanism to the spool by one of the guide members. As the spool is rotated, friction gripping portions on the hub of the spool grip the tape at the points where the tape is held against the hub by the guide members and wrap the tape around the spool. When the tape has been wrapped around the spool a sufficient number of times to prevent slipping, the pressure exerted by the guide members for holding the tape against the hub is relieved. When all of the tape is wound on the spool, the spool is removed from the take-up means. Upon such removal of the spool from the take-up means the friction gripping portions on the hub are rendered inoperative to facilitate removal of the tape roll from the spool for storage or further use of the tape and for re-use of the spool.

The invention and its advantages will be further apparent by reference to the following detailed description and drawings wherein.

Figure 1:
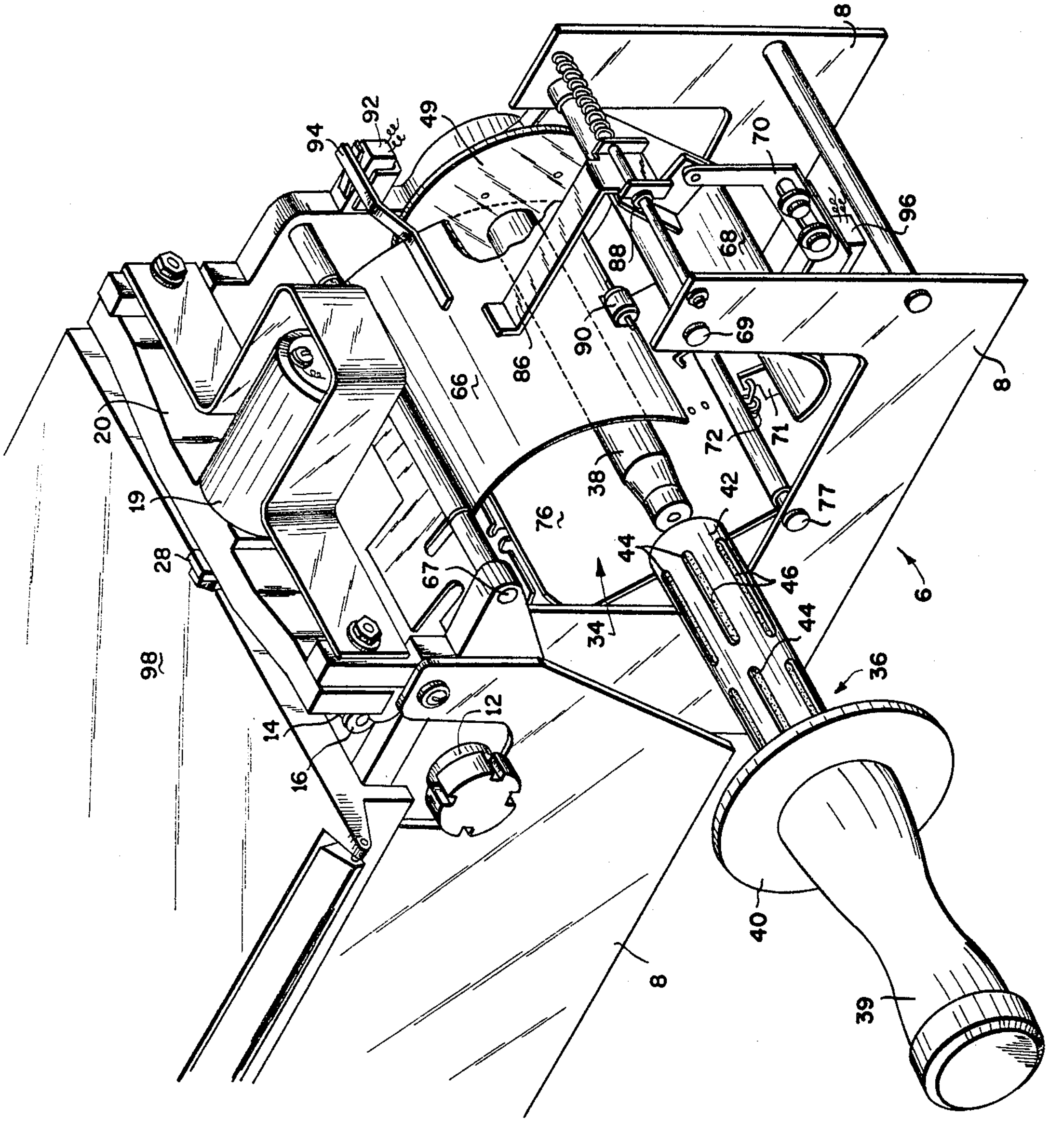
FIG. 1 is a perspective view of a drive mechanism and take-up means in accordance with the invention with the take-up spool, which forms a part of the take-up means, being shown in its disengaged position.
Figure 2:
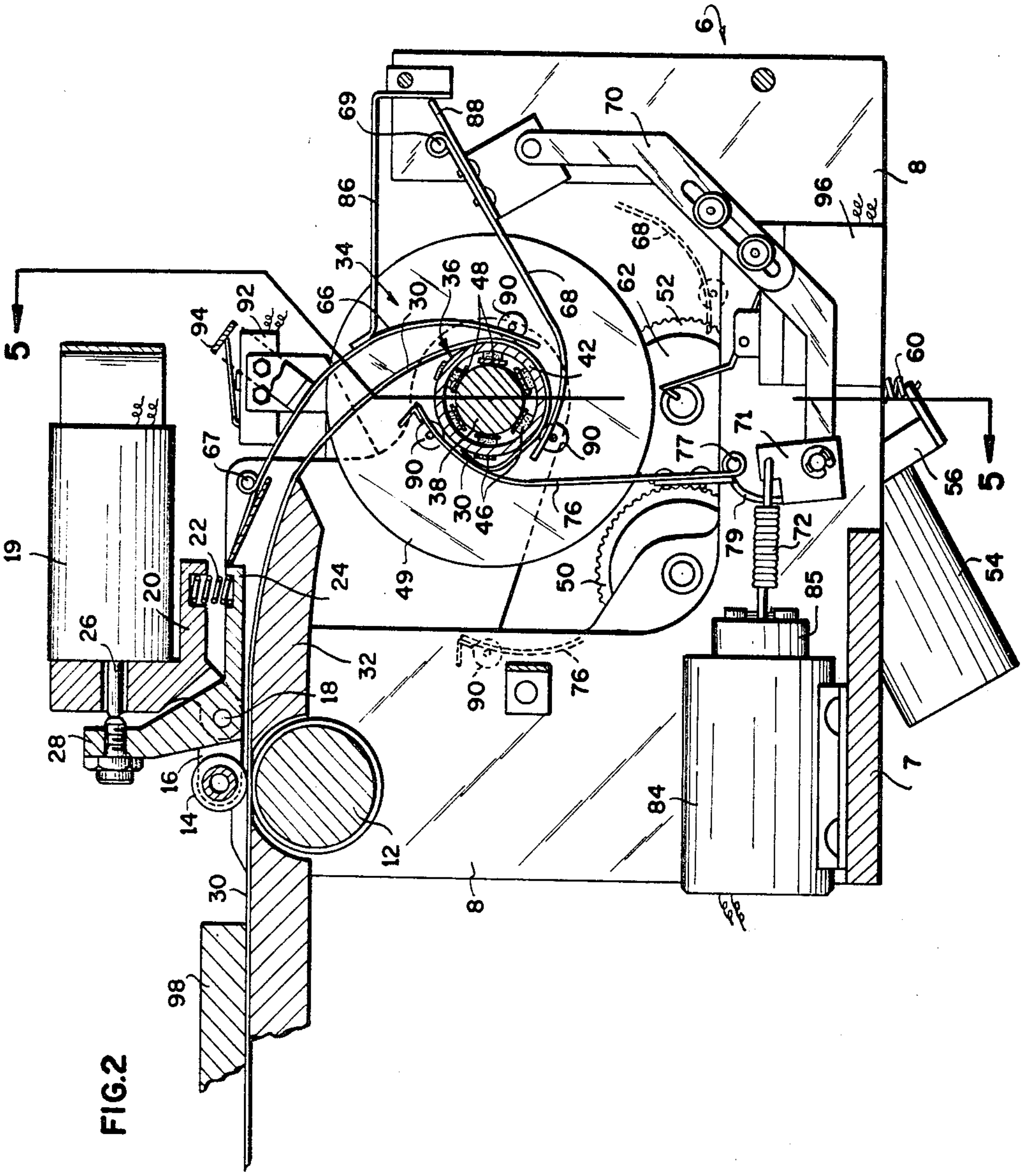
FIG. 2 is a partially sectioned view of one side of the drive mechanism and take-up means shown in FIG. 1 showing the take-up spool in its engaged position and the tape starting to be wound thereon.
Figure 3:
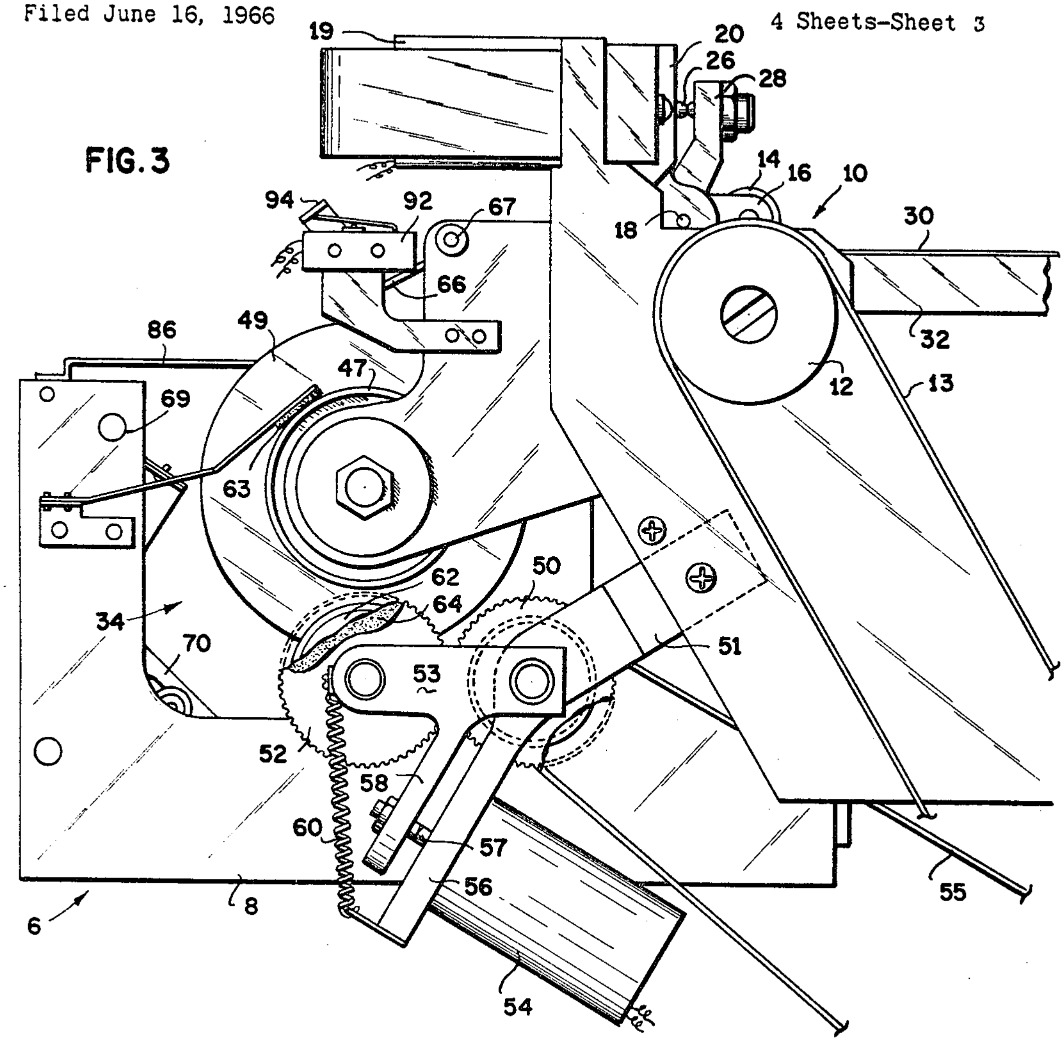
FIG. 3 is a view of the other side of the drive mechanism and take-up means shown in FIG. 1.

Referring to the drawings, and particularly to FIGS. 1, 2 and 3, a housing 6 which includes base plate 7 and side plates 8, houses a drive mechanism 10 comprising a drive roller 12 continuously driven through an endless belt 13 (FIG. 3) by an electric motor (not shown). A pressure roller 14, superimposed over the drive roller 12, is mounted to bracket 16 which is pivotably mounted to the housing 6 by pivot pin 18. A solenoid 19 is mounted by a brace 20 to the housing 6 and a compression spring 22 between the brace 20 and a laterally extending arm 24 of bracket 16 urges clockwise pivotal movement (as viewed in FIG. 2) of the bracket to urge the pressure roller 14 away from the drive roller 12. The solenoid plunger 26 is positioned to engage an upwardly extending arm 28 of the bracket 16 to force counter-clockwise movement of the bracket 16 and cause the pressure roller 14 to move against the drive roller 12. As the pressure roller 14 is moved against the drive roller 12, a paper tape 30 positioned in the nip between the pressure roller and drive roller is moved forward.

Figure 4:
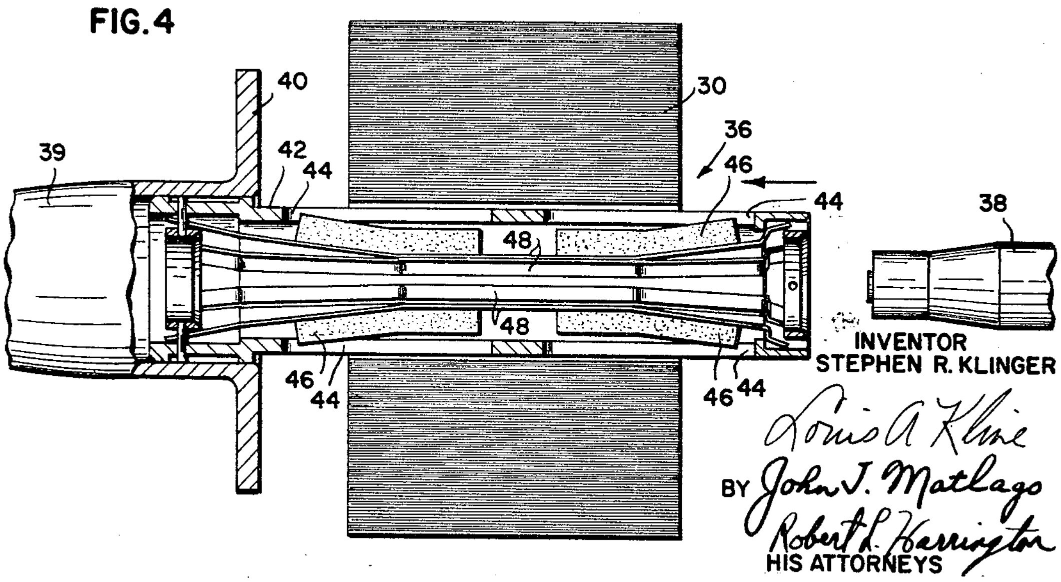
FIG. 4 is a sectioned view of the take-up spool shown in FIG. 1 but illustrated with a roll of paper tape wound thereon and after it has been removed from the take-up means.
Figure 5:
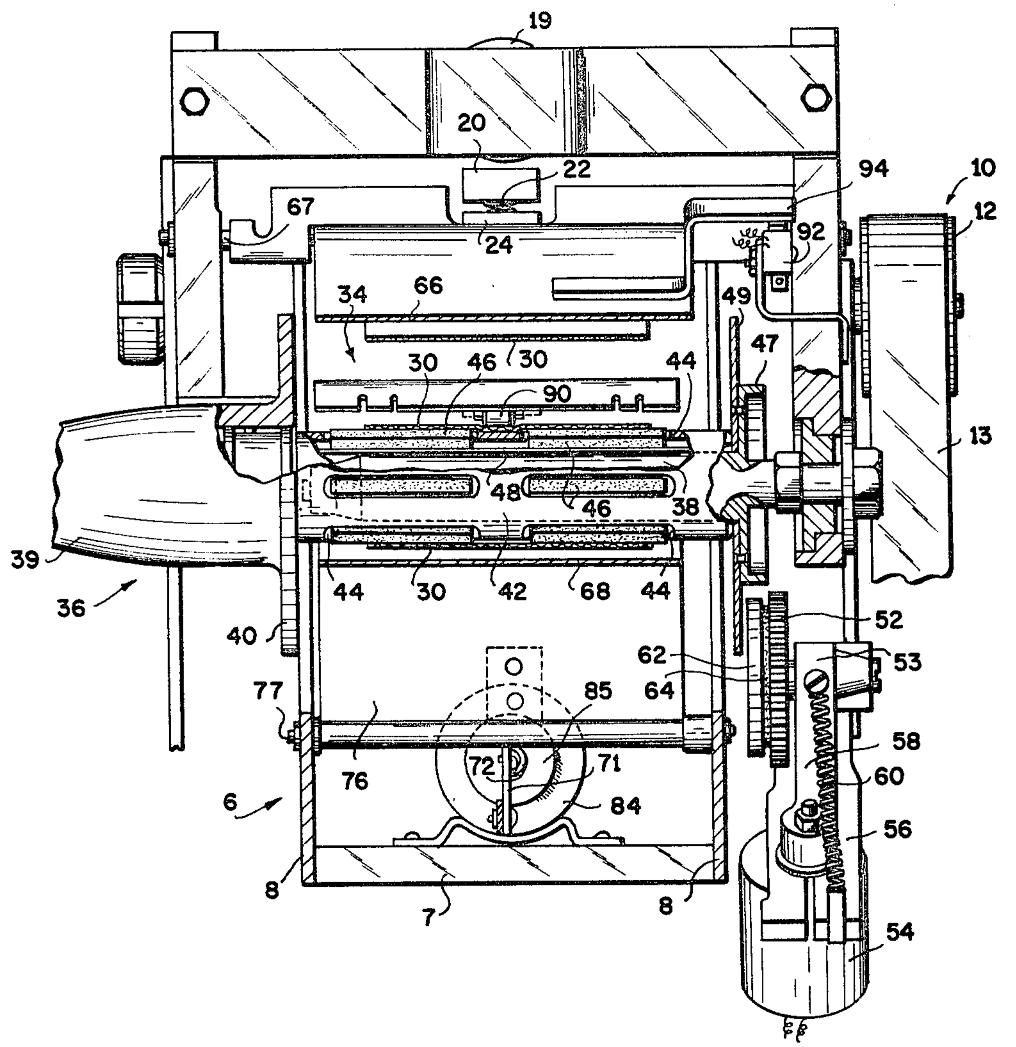
FIG. 5 is a sectioned view taken on line 5—5 of FIG. 2.

A ramp 32, fixed to the housing, supports the paper tape 30 as it moves from the nip and directs it toward a take-up mechanism 34. The take-up mechanism comprises a spool 36 having a cylindrical hub 42 which can be slidably fitted onto the free end of a drive spindle 38 the other end of which is rotatably mounted to the housing. As best shown in FIGS. 1 and 4, the spool 36 comprises handle 39, retaining flange 40 and cylindrical hub 42. The hub 42 is provided with two rows of slots or openings 44 each row comprising six slots symmetrically spaced around the hub. Six leaf springs 48 (FIG. 4) are mounted inside the hub co-extensive with the cylindrical axis thereof. Both ends of the leaf springs are connected to the hub 42 at points adjacent to the underside of its cylindrical wall with the intermediate portion convexly bowed toward the hub axis. A pair of friction gripping pads 46, e.g. rubber pads, is attached to the concave side of the intermediate portions of each of the six leaf springs 48 with each pad 46 radially aligned with a slot 44 of each row of slots. The leaf springs 48 are bowed so as to be biased for normally maintaining the pads withdrawn inside the hub 42 as shown in FIG. 4. However, when the hub 42 is positioned on the free end of the drive spindle 38, the spindle engages the leaf springs 48 forcing them radially outward and thereby causes the pads 46 to extend through the openings 44 as shown in FIG. 5. (It will be noted that, as shown in FIG. 4, the bowed springs 48 have slight bends. Such provides for the pads when extended through the hub, to lie generally parallel with the hub axis.)

The drive spindle 38 has a shoulder portion 47 on the end opposite its free end. A retaining flange 49 is attached to the shoulder portion 47. The outer end of spool hub 42 is abutted against the face of flange 49 when properly positioned for receiving the tape from the drive mechanism. The drive means for the spindle (see FIG. 3) comprises a belt driven gear 50 (driven through belt 55 by the same motor used to drive the drive roller 12) that is mounted through bracket 51 to the housing. A second gear 52 engaged with and continuously driven by the belt driven gear 50 is mounted on a brace 53 that is pivotally attached to the bracket 51 to permit angular movement of the second gear about the driven gear 50 while maintaining engagement between the gears.

A solenoid 54 is mounted to an arm 56 extending from the stationary bracket 51 with the solenoid plunger 57 positioned for engagement with an arm 58 extending from the brace 53. A tension spring 60 extending between the brace 53 and the arm 56 of the bracket 51 urges a counter-clockwise rotation of the second gear 52 (as viewed in FIG. 3) whereas energizing the solenoid overcomes the tension spring and induces a clockwise rotation about the driven gear 50.

Referring particularly to FIGS. 3 and 5, a rubber disc 62 is freely rotatable on the shaft of the second gear 52 (and thus also has angular movement about the driven gear 50) with a felt interlayer 64 between the disc 62 and the second gear 52. Thus, whereas the friction engagement of the continuously rotating second gear urges similar rotation of the disc 62, the felt interlayer acts as a slip clutch. The shoulder portion 47 of the spindle 38 is aligned for friction driving engagement with the rubber disc 62.

As best shown in FIG. 3, when the second gear 52 with disc 62 is positioned in the counter-clockwise position, i.e. when the solenoid 54 is deenergized, the aligned rubber disc 62 and the shoulder portion 47 of the drive spindle 38 are separated. Energizing the solenoid pivots the disc 62 into contact with shoulder 47 and causes rotation of the drive spindle 38 and take-up spool 36. A dampener 63 (see FIG. 3) is in continuous engagement with the shoulder portion 47 to prevent undesired "backlash" of the drive spindle 38 when the driven disc 62 is disengaged from the shoulder portion 47.

Referring now to the means for automatically starting the winding of the tape onto the take-up spool shown most clearly in FIGS. 1 and 2, a lead-in guide member 66 is pivotably connected through pin 67 to the housing 6 at a point over the end of ramp 32, and extends in a curved path toward and against the hub 42 of the take-up spool 36. A first retractable guide member 68 is pivotably connected to the housing 6 through pin 69 for pivotal movement of the retractable guide member 68 against the hub 42 of the spool 36. The point at which the retractable guide member 68 contacts the hub 42 is about 120° angularly around from the point at which the lead-in guide member 66 contacts the hub 42. The guide member 68 is further connected to a retracting mechanism comprising linkage means 70 connected to a plate 71, that is connected through a cushion spring 72 to a plunger 85 of a solenoid 84. A second rectractable guide member 76 is pivotably connected by pin 77 to the housing 6 for pivotal movement of the second retractable guide member 76 against the spool. The point at which the second retractable guide member contacts the hub 42 is about 120° angularly around from the point at which the first retractable guide member contacts the spool. Thus, the three guide members 66, 68 and 76 are positioned approximately symmetrically around the hub 42. An arm 79 of the plate 71 (see FIG. 2) is fixed to the second retractable guide member 76. Thus, as viewed in FIG. 2, outward movement of the solenoid plunger 85 (which occurs when the solenoid is deenergized) forces counter-clockwise pivotal movement of the plate 71 about the pin 77, and retracting pivotal movement (also counter-clockwise as viewed in FIG. 2) of the interconnected first and second retractable guide members 68 and 76. Withdrawal of the solenoid plunger 85 (occurring when the solenoid is energized) produces clockwise pivotal movement of plate 71, and spool engaging pivotal movement of the retractable guide members.

An L-shaped pressure bar 86 of flexible metal or the like is pivotably connected near the bend of the L to the housing 6 with the longer section of the bar 86 abutted against the upper surface of the lead-in guide member 66. An extension 88 of the first retractable guide member 68 is adapted to engage the shorter element of the bar 86 when the first retractable guide member 68 is in its hub engaging or non-retracted position, to thereby hold the pressure bar 86 against the lead-in guide member 66 for spring biased holding of the lead-in guide member against the hub 42 of the take-up spool 36. Upon retraction of the first retractable guide member 68, the pressure bar 86 is freely rotatable and the pressure is accordingly released from the lead-in guide member 66. Idling rollers 90, positioned on each of the guide members where they engage the hub, reduce the drag resistance of the guide members to a tape 30 as the tape is wound around the spool. The rollers 90 are positioned between the two rows of extended rubber pads 46, rather than directly over the pads, to avoid having the guide plates flutter in and out as the rollers ride over the successive pads. It has been found that this arrangement exerts sufficient pressure of the tape against the pads to obtain the desired friction gripping of the tape.

A micro-switch 92 mounted on the housing 6 over the lead-in guide member 66 controls the energizing of the solenoid 84 and is closed by a finger member 94 carried by the lead-in guide member 66. Thus, when the lead-in guide member 66 is abutted against the hub 42 of the spool 36, the switch 92 is closed by the finger 94, the solenoid 84 is energized and the retractable guide members 68 and 76 are moved into hub engaging position. When the lead-in guide member 66 is moved outward from the hub 42, as when the tape 30 has been wrapped a number of times around the hub, the finger member 94 is moved off of the switch 92 and the solenoid 84 is deenergized and the retractable guide plates 68 and 76 are retracted. It will be noted that FIG. 1 shows the guide plates 68 and 76 in a retracted position and FIG. 2 shows them in hub engaging position.

A normally closed switch 96 (FIG. 2) interconnected with the main circuit of the equipment is positioned with respect to the spool's hub 42 to prevent overloading of the spool 36. When a maximum number of windings are made on the spool, as determined by the increased diameter of the tape roll, the switch 96 is engaged by the roll and opened. The equipment including the drive mechanism and take-up spindle is then stopped.

*Operation*

As heretofore discussed, setting up read-out equipment such as contemplated by the take-up mechanism herein described involves placing a roll of paper tape 30 into a feed-out station (not shown) and pulling the leading edge thereof over the read-out station positioned under the cover 98 (shown in FIG. 1) and into the nip of the drive mechanism 10. A control mechanism induces excitement of the solenoid 19 for controlled movement of the tape 30 synchronized with the needs of the read-out equipment. The tape is moved from the nip, down the guide ramp 32, and, as shown most clearly in FIG. 2, the lead-in guide member 66 directs the tape against the hub 42 of the spool 36. The guide member 66 holds the tape 30 against the hub 42 while the hub is rotated by action of the solenoid 54 energized simultaneously with the solenoid 19.

To avoid any slack in the tape between the drive mechanism 10 and the take-up spool 36, it is desirable for the spindle driving mechanism to urge an exaggerated rate of wind-up to the spool 36, e.g. a ratio to the drive of the drive mechanism of about 2:1, with the slip clutch provided by the felt interlayer 64 absorbing the difference. The friction gripping means 46 on the hub forces the leading edge of the tape beyond the lead-in guide member 65 and into contact with the first retractable guide member 68. The first retractable guide member 68 directs the leading edge of the tape 30 back into contact with the hub 42 where again said friction gripping means 46 forces movement of the leading edge beyond guide member 68 and into contact with the second retractable guide member 76. The guide member 76 again directs the tape into contact with the friction gripping means of the hub which continues the movement of the tape 30 around the reel hub 42 to be trapped under the next successive winding of the tape. With the exaggerated rate of rotation that is urged by the spindle drive mechanism to the spool 36, the tape 30 is under a continuous tension as it is taken from the drive mechanism 10 to avoid the occurrence of any slack and to insure that the tape is tightly wound on the spool.

When a predetermined number of windings are made around the hub 42, the lead-in guide member 66 is forced away from the hub to where the finger 94 is lifted off of switch 92 and the solenoid 84 is deenergized to retract the second and third guide members 68 and 76. At the same time the pressure applied to the first guide member through pressure bar 86 is released and the tape roll is free to wind without interference from the guide members.

When the winding operation is completed, the tape spool 36 is removed from the drive spindle 38 as shown in FIG. 4. Whereas the spindle 38 when positioned inside the hub 42 of spool 36 deflects the leaf springs 48, upon removal of the spool, the leaf springs 48 retract the friction gripping means 46 and the tape roll is easily removed from the spool for storage or further use.

Although the above embodiment is subject to numerous variations without departing from the scope of the invention, certain advantages are realized by certain of the features described. Thus, for example, it is desirable when winding fairly stiff paper tape for the tape 30 to be brought into early engagement with the spool hub 42. Attempting to merely form a pathway for the tape to curl it around the hub, without the benefit of the driving movement of the hub, and especially in view of the fairly rapid speeds at which modern read-out equipment is able to handle register tapes (e.g. about 13 inches per second) will often result in the tape buckling and becoming entangled. For similar reasons it is desirable to provide the three spaced points at which the guide members 68 and 76 force the tape into engagement with the hub 42 to be located generally symmetrically around the hub, i.e. at about 120° angular increments. The contact positions may, however, be more specifically located with advantage (which locations are not necessarily exactly symmetrical) as for example, to account for different tape stiffness, slight variations to the equipment design, etc.

Unless sufficient tension is applied to the guide members, a stiff paper tape will resist deflection and force the guide members away from the hub and thereby avoid being engaged by the friction gripping pads 46. However, sufficient pressure applied against the paper roll by the guide members to avoid this is often such that if continued throughout the wrapping of the roll, it will cause uneven rolling, wrinkling of the paper and other undesirable effects. Thus, it is desirable to provide a pressure release mechanism for the guide members such as described.

It will also be apparent that variations may be made to the spool 36. For example, the handle 39 is provided for convenience but can be deleted without affecting the operation. The spool 36 features which are preferred for the illustrated embodiment of the invention include the means whereby the tape roll can be easily removed from the tape spool after the winding operation is completed, while providing the necessary friction surface areas to initially start the winding of the tape onto the spool. Both effects are accomplished by providing a mechanism for automatic exposure of the friction gripping pads 46 when the spool is mounted on the spindle and an automatic withdrawal of the pads when the spool 36 is removed from the spindle 38.

It will be noted that whereas the end of a tape will be securely grasped and tightly wound on the spool 36 by the take-up mechanism herein described, the end of the tape will not be mutilated as might occur, for example, if the hub 42 carried prongs or adhesives for gripping the tape. Thus, with the present device, where desired, the tape can be reread by merely slipping the roll off the spool hub and placing it in the read-out station. The tape is reversed on the roll with the orginal leading edge at the center of the roll, and vice versa. However, in systems such as described in the commonly assigned copending patent application Ser. No. 238,371, provision may be made for reading the tape backwards.

It will be noted that many of the features provided by the take-up mechanism of the present invention are especially desirable for optical read-out systems such as described in U.S. Patent No. 3,217,294. The manner in which the tape is started on the roll avoids any marking of the tape which would interfere with the optical properties of the tape for rereading. Also, whereas optical read-out tape is characteristically of heavy paper and therefore stiff, the take-up means provides the necessary retractable presure bearing guide members 68 and 76 and friction gripping surface areas of the hub. Still further, the take-up means is adapted for synchronized movement with whatever intermittent driving motion may be demanded of the tape driving mechanism by the read-out equipment, while maintaining a constant tension on the tape to prevent slack from occurring between the drive mechanism and the take-up means.

It is to be understood, however, that various embodiments and variations of the present invention are contemplated and will become apparent to those skilled in the art without departing from the spirit and scope of the invention. The invention is therefore not limited to the apparatus and procedures described, but includes all embodiments within the scope of the claims.

What is claimed is:

1. A take-up means for automatically starting the winding of a tape into a roll on a take-up spool comprising a take-up spool rotatively mounted to a housing, drive means for rotating the take-up spool, a plurality of guide members mounted to the housing and positioned around the spool for receiving a tape and guiding it toward and against the rotating spool, pressure means for urging the guide members toward the rotaing spool to induce friction gripping contact between the tape and the spool, and release means for releasing said pressure means from the guide members after the roll has been started to permit free winding of the tape onto the spool.

2. A take-up means as defined in claim 1 wherein at least one of the guide members is retractable away from the spool, and means for retracting said retractable guide member after the tape has been started on the spool.

3. A take-up means as defined in claim 1 including idler rollers mounted on the guide members at the point where pressure is exerted against the spool for reducing drag resistance of the guide members to a tape being wound on the spool.

4. A take-up means for automatically starting the winding of a tape onto a take-up spool comprising a housing, a spindle providing the mounting for a take-up spool rotatively mounted to the housing, means for imparting rotative movement to the spindle, a guide member connected to the housing and forming a pathway from said connection to and partially around the take-up spool provided on the spindle for guiding a tape received into the housing toward and against the rotating take-up spool, biasing means engaging the guide member for urging the guide member toward the hub of the spool to induce friction gripping contact between the hub of the spool and the tape, release means carried by the housing and interconnected with the biasing means for releasing the pressure exerted by the biasing means against the guide member, and means for activating the release means when the guide member is radially moved a predetermined distance from the hub by interwrapped layers of the tape.

5. A take-up means for automatically starting the winding of a tape onto a take-up spool as defined in claim 4 wherein said drive spindle comprises a shaft having one end rotatably mounted to the housing and the other end free for receiving a take-up spool, and including a take-up spool removably mounted on said shaft, said spool comprising a cylindrical wall having an opening therein, a fraction gripping pad mounted for radial movement within the cylindrical wall, said friction gripping pad aligned with said opening and having a radially extending position with the pad extended through the opening and protruded outward of the outer surface of the cylindrical wall, and having a retracted position with the pad drawn into the cylindrical wall, and means for moving the pad into its extended position for friction gripping of a tape to be wound onto the spool and for moving the pad into its retracted position to enable easy removal of the tape roll from the spool.

6. A take-up means for automatically starting the winding of a tape onto a take-up spool as defined in claim 4 including a second guide member pivotably connected to the housing for pivotal movement against the spool at a position around the spool from the point of contact of the first guide member with the spool of about 120°, and a third guide member pivotably connected to the housing for pivotal movement against the spool at a position around the hub from the point of contact of the second guide member with the spool of about 120°, and means interconnected with the second and third guide members for pivotally moving the said second and third guide members into their spool engaging positions and for retracting the said second and third guide members in response to the activation of said release means.

7. A take-up means for automatically starting the winding of a tape onto a take-up spool as defined in claim 6 wherein said release means comprises a switch that is closed by a finger member carried by the first guide member, and wherein said means for pivotally moving the second and third guide members comprises linkage members interconnecting the guide members to a solenoid that is energized in response to the closed switch.

8. A take-up means for automatically starting the winding of a tape onto a take-up spool as defined in claim 7 wherein said biasing means engaging the first guide member comprises a pressure bar pivotally connected intermediate of its ends to the housing with one end abutting the first guide member for urging it toward the take-up spool, and further including an extension of the second guide member for engaging the other end of the pressure bar when said second guide member is in its spool engaging position for pivotal urging of the pressure bar against the first guide member to provide said biased urging of the first guide member toward the spool, and upon retraction of the second guide member, for releasing the pressure bar and thereby removing said biased urging of the first guide member toward the spool.

9. For use in a take-up means that automatically starts the winding of a tape into a roll, a spool comprising a cylindrical hub having a smooth outer cylindrical surface, the wall of the cylinder having an opening, a friction gripping pad mounted for radial movement within the cylindrical hub, said friction gripping pad aligned with said opening and having a radially extended position with the pad extended through the opening and protruded outward of the outer surface of the hub, and having a retracted position with the pad drawn into the hub and inward of the outer surface of the hub, and means for moving the pad into its extended position for friction gripping of a tape to be wound onto the spool, and for moving the pad into its retracted position to enable easy removal of the tape roll from the smooth surface of the spool hub.

10. For use in a take-up means that automatically starts the winding of a tape into a roll, a take-up spool as defined in claim 9 wherein said friction gripping pad is carried by a leaf spring, said leaf spring being mounted inside the cylinder coextensive with the cylindrical axis, the ends of the spring attached to the inside of the cylinder wall and the intermediate portion being normally convexly bowed toward the cylindrical axis and said pad carried thereby being withdrawn into the cylinder when said spring is normally convexly bowed, said spring being engaged by a drive spindle when the spool is mounted thereon to radially deflect the spring and move the pads through said opening for exposure outside the hub.

References Cited

UNITED STATES PATENTS

| | | | |
|---|---|---|---|
| 2,051,036 | 8/1936 | Foster et al. | 242—55.11 |
| 3,222,007 | 12/1965 | Schmuck | 242—71 |

FOREIGN PATENTS

| | | |
|---|---|---|
| 460,622 | 12/1924 | Germany. |

LEONARD D. CHRISTIAN, *Primary Examiner.*